(12) United States Patent
Scheid et al.

(10) Patent No.: US 9,092,920 B2
(45) Date of Patent: Jul. 28, 2015

(54) SYSTEM AND METHOD FOR MANAGING A VEHICLE AND A FLEET OF VEHICLES

(75) Inventors: Paul R. Scheid, West Hartford, CT (US); William H. Beacham, Jr., Enfield, CT (US)

(73) Assignee: United Technologies Corporation, Hartford, CT (US)

( * ) Notice: Subject to any disclaimer, the term of this patent is extended or adjusted under 35 U.S.C. 154(b) by 0 days.

(21) Appl. No.: 13/431,671

(22) Filed: Mar. 27, 2012

(65) Prior Publication Data

US 2013/0261881 A1    Oct. 3, 2013

(51) Int. Cl.
*G01M 17/00* (2006.01)
*G07C 5/00* (2006.01)
*G07C 5/08* (2006.01)

(52) U.S. Cl.
CPC .............. *G07C 5/008* (2013.01); *G07C 5/085* (2013.01)

(58) Field of Classification Search
CPC .......... G07C 5/085; G07C 1/00; G07C 5/008; B60G 2800/98; B60R 2021/01311; B60R 25/00; B60R 25/04; B60R 25/2081; B60R 25/302; B60R 25/305; G05B 23/0289; G06F 11/24; G06F 1/26; G08G 1/096827
USPC ........... 701/33.4, 48, 1, 117, 29.1, 32.6, 33.8, 701/36, 409, 532, 93, 96; 714/E11.154, 14, 714/22, 47.2; 340/436, 901
See application file for complete search history.

(56) References Cited

U.S. PATENT DOCUMENTS

| | | | |
|---|---|---|---|
| 6,366,199 B1 | 4/2002 | Osborn et al. | |
| 6,985,803 B2 | 1/2006 | Abdel-Malek et al. | |
| 7,167,788 B2 | 1/2007 | Loda et al. | |
| 7,343,331 B2 | 3/2008 | Whitenack et al. | |
| 7,548,802 B2 | 6/2009 | Avery et al. | |
| 7,606,641 B2 | 10/2009 | Allen | |
| 7,755,512 B2 | 7/2010 | Ziarno | |
| 7,761,200 B2 | 7/2010 | Avery et al. | |
| 7,761,201 B2 | 7/2010 | Avery et al. | |
| 7,844,385 B2 | 11/2010 | Loda et al. | |
| 7,913,232 B2* | 3/2011 | Erkkinen | 717/126 |
| 2002/0103622 A1 | 8/2002 | Burge | |
| 2003/0095038 A1* | 5/2003 | Dix | 340/425.5 |
| 2003/0105565 A1 | 6/2003 | Loda et al. | |
| 2003/0204777 A1* | 10/2003 | Kojori | 714/14 |
| 2008/0126111 A1* | 5/2008 | Loda | 705/1 |
| 2011/0184607 A1* | 7/2011 | Beacham et al. | 701/35 |

OTHER PUBLICATIONS

International search report for PCT/US2013/034126 dated May 16, 2013.

* cited by examiner

*Primary Examiner* — Redhwan K Mawari
(74) *Attorney, Agent, or Firm* — O'Shea Getz P.C.

(57) ABSTRACT

A system and method for managing a vehicle is provided that includes at least one sensor, a certified processor, a database, a computer network, and a user portal. The at least one sensor is operable to generate data indicative of a critical condition of the vehicle. The certified processor in communication with the computer network and is operable to receive, process and store the data generated by the at least one sensor. The database is in communication with the computer network and is operable to selectively download and store a replica of the data stored on the certified processor via the computer network. The user portal is in communication with the computer network and is operable to enable a user to download, via the computer network, selected portions of the data stored on the certified processor or selected portions of the replica data stored on the database.

15 Claims, 2 Drawing Sheets

SYSTEM AND METHOD FOR MANAGING A VEHICLE AND A FLEET OF VEHICLES

BACKGROUND OF THE INVENTION

1. Technical Field

The present invention relates to systems and methods for managing products in general, and to systems and methods for managing a vehicle and a fleet of vehicles using on-board computer networking systems in particular.

2. Background Information

On-board computer networking systems may be used to create systems and methods for managing a vehicle (e.g., an aircraft) and a fleet of vehicles. On-board computer networking systems allow data to be collected, stored and/or processed for various subsystem components of a vehicle. The data may be converted into usable knowledge that is made available to selected users, such as original equipment manufacturers, vehicle owners, vehicle operators, and service providers. On-board computer networking systems enable access to data from the vehicle locally or remotely. There is a need for improved on-board computer networking systems, and there is a need for improved systems and methods for managing a vehicle and a fleet of vehicles using on-board and off-board computer networking systems.

SUMMARY OF THE INVENTION

According to one aspect of the present invention, a system for managing a vehicle is provided. The system includes at least one sensor, a certified processor, a database and a computer network. The at least one sensor is installed on the vehicle. The at least one sensor is operable to generate data indicative of a critical condition of the vehicle. The certified processor is located on the vehicle and in communication with the computer network. The certified processor is operable to receive, process and store the data generated by the at least one sensor. The database is located remote from the vehicle and in communication with the computer network. The database is operable to selectively download and store a replica of the data stored on the certified processor via the computer network.

According to another aspect of the present invention, a method of managing a vehicle is provided. The method includes the steps of: (1) using at least one sensor installed on the vehicle to generate data indicative of a critical condition of the vehicle; (2) using a certified processor located on the vehicle to receive, process and store the data generated by the at least one sensor; (3) selectively downloading and storing a replica of the data stored on the certified processor to a database located remote from the vehicle, via the computer network; and (4) using a user portal located remote from the vehicle and in communication with the computer network to enable at least one of a plurality of users to download, via the computer network, selected portions of the data stored on the certified processor or selected portions of the replica data stored on the database.

In a further embodiment of any of the foregoing embodiments, a user portal may be provided. The user portal may be located remote from the vehicle and in communication with the computer network. The user portal enables at least one of a plurality of users to download, via the computer network, selected portions of the data stored on the certified processor or selected portions of the replica data stored on the database.

In a further embodiment of any of the foregoing embodiments, the user portal may be operable to prevent at least one of the plurality of users from downloading selected portions of the data or the replica data.

In a further embodiment of any of the foregoing embodiments, the user portal permits a first of the plurality of users to access a first selected portion of the data or the replica data, the user portal permits a second of the plurality of users to access a second selected portion of the data or the replica data, and the first selected portion may be different from the second selected portion.

In a further embodiment of any of the foregoing embodiments, the user portal may be operable to receive and follow instructions from at least one of the plurality of users.

In a further embodiment of any of the foregoing embodiments, the instructions direct the user portal to prevent at least one of the plurality of users from downloading selected portions of the data or the replica data.

In a further embodiment of any of the foregoing embodiments, the computer network is one of a wired computer network or a wireless computer network.

In a further embodiment of any of the foregoing embodiments, the database may be operable to store the replica data within a hierarchical directory of folders.

In a further embodiment of any of the foregoing embodiments, the directory of folders are arranged according to American Transportation Association Chapter numbers.

In a further embodiment of any of the foregoing embodiments, the certified processor is operable to execute software, wherein the software is Level A software as defined by the Radio Technical Commission for Aeronautics DO-178B specifications.

In a further embodiment of any of the foregoing embodiments, the data generated by the at least one sensor may be indicative of whether a part of the vehicle requires repair or replacement.

In a further embodiment of any of the foregoing embodiments, a microserver may be provided. The microserver may be in communication with the certified processor and the database.

In a further embodiment of any of the foregoing embodiments, a subsystem controller may be provided. The subsystem controller may be in communication with the certified processor and the at least one sensor.

In a further embodiment of any of the foregoing embodiments, the subsystem controller may be an engine subsystem controller, an auxiliary power unit subsystem controller, an environmental control subsystem controller, or an electrical distribution subsystem controller.

The foregoing features and advantages and the operation of the invention will become more apparent in light of the following description of the best mode for carrying out the invention and the accompanying drawings.

DETAILED DESCRIPTION OF THE INVENTION

Figure 1:
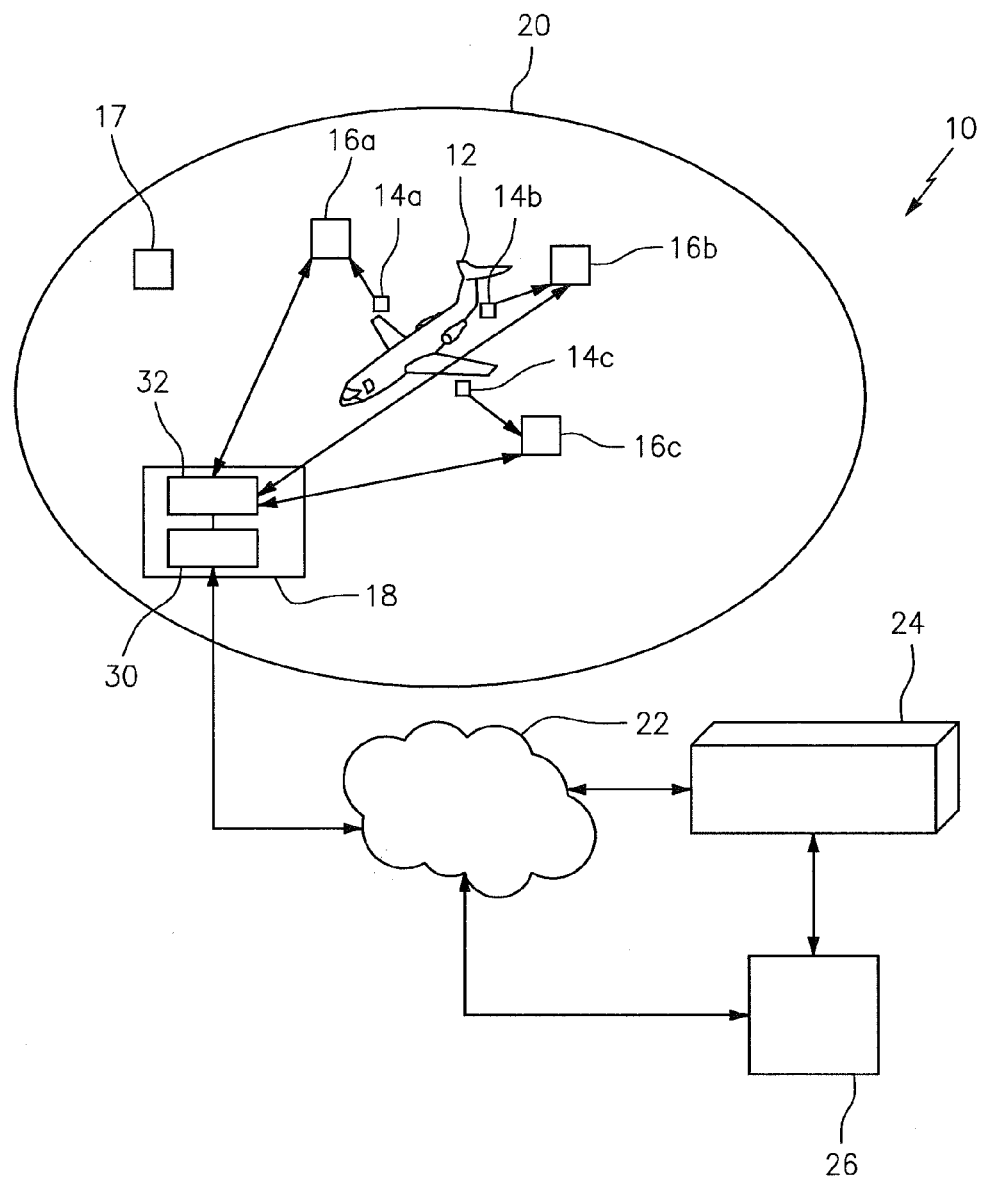
FIG. 1 is a schematic diagram of the present invention system.
Figure 2:
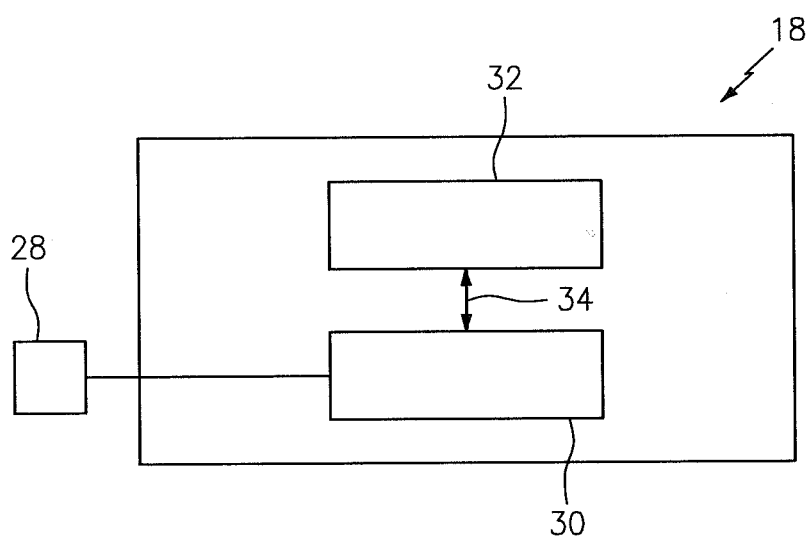
FIG. 2 is a schematic diagram of the FAST system included in the present invention system illustrated in FIG. 1.

FIGS. 1 and 2 illustrate an embodiment of the present invention system 10. The system 10 includes a vehicle 12, a plurality of sensors 14a-c, a plurality of subsystem controllers 16a-c, a Flight-data Acquisition, Storage and Transmission ("FAST") system 18, a local Internet 20, a global Internet 22, a ground mirror database 24, and a user portal 26. Communications within the system 10 are indicated in FIG. 1 by arrows.

In FIG. 1, the vehicle 12 is shown to be an aircraft. The present system 10 is not limited to use with an aircraft; the vehicle 12 may alternatively be, e.g., an automobile, an elevator, etc. Typically, the system 10 will include a plurality of vehicles (e.g., a fleet of aircraft). However, for ease of description, the system 10 is shown in FIG. 1 and is described herein as including only one vehicle.

Each of the sensors 14a-c is operable to generate data indicative of one or more conditions of a subsystem component of the vehicle 12 (e.g., the engine and components of the engines). The sensors 14a-c may be, e.g., pressure sensors, temperature sensors, oil sensors, engine speed sensors, vibration sensors or feedback sensors. An example of an acceptable sensor is the vibration sensor described in U.S. patent application Ser. No. 12/132,847, which is incorporated herein by reference. Each of the sensors 14a-c are operable to send data to a corresponding subsystem controller 16a-c. In the embodiment illustrated in FIGS. 1 and 2, each sensor 14a-c sends data to a single, corresponding subsystem controller 16a-c; e.g., sensor 14a is paired with subsystem controller 16a, sensor 14b is paired with subsystem controller 16b, and so on. In alternative embodiments, multiple sensors may send data to each subsystem controller 16a-c. In the embodiment illustrated in FIGS. 1 and 2, the sensors 14a-c send data to the subsystem controllers 16a-c via wired connections. The wired connections may be a data bus; e.g., one similar to that described in U.S. patent application Ser. No. 12/692,711, which is incorporated herein by reference. In alternative embodiments, the sensors 14a-c may send data to the subsystem controllers 16a-c wirelessly; e.g., via the local Internet 20, discussed in detail below.

Each of the subsystem controllers 16a-c includes a processor, memory (e.g., RAM, Flash memory, a hard drive or other electronic, optical, magnetic or other mass storage), and at least one input/output ("I/O") device. Each of the subsystem controllers 16a-c is operable to control at least one corresponding sensor 14a-c and is operable to receive data generated by the at least one corresponding sensor 14a-c. The subsystem controllers 16a-c may include, e.g., an engine subsystem controller, an auxiliary power unit (APU) subsystem controller, an environmental control subsystem controller, and an electrical distribution subsystem controller. Each of the subsystem controllers 16a-c is operable to send and receive data to and from the FAST system 18. In the embodiment illustrated in FIGS. 1 and 2, the subsystem controllers 16a-c are operable to continuously send data to the FAST system 18 as it is received from the sensors 14a-c. In alternative embodiments, the subsystem controllers 16a-c are operable to store data received from the sensors 14a-c, and are operable to communicate data to the FAST system 18 only at specific times. The timing and frequency of data communication between the sensors 14a-c and the subsystem controllers 16a-c, and between the subsystem controllers 16a-c and the FAST system 18, is controlled by the FAST system 18, as discussed in detail below. The subsystem controllers 16a-c include software stored in memory, which, when executed, enable the subsystem controllers 16a-c to perform the functions described herein. The software stored in the memory of the subsystem controllers 16a-c may be any software acceptable for performing the functions described herein. Notably, the software stored in the memory of the subsystem controllers 16a-c may be "Level A" software, "Level B" software, or "Level C" software as defined by the Radio Technical Commission for Aeronautics (RTCA) DO-178B specifications. The RTCA DO-178B specifications define five levels of avionics software: A, B, C, D and E. Level A software is considered the highest criticality, and Level E software is the lowest criticality. Level A software may be preferred or required when avionics data is being manipulated (e.g., translated, condensed, processed, formatted, etc.) to maintain its level of criticality. The software stored in the memory of the subsystem controllers 16a-c manipulates the data received from the sensors 14a-c, and thus the software stored needs to be "Level A", "Level B", or "Level C" software to maintain the level of criticality of the data.

Referring to FIG. 2, the FAST system 18 includes an antenna 28, a microserver 30, and a certified processor 32. In the embodiment illustrated in FIGS. 1 and 2, the FAST system 18 is installed in the cabin of the vehicle 12 and uses existing infrastructure (e.g., power supply, mounting devices, etc.) already installed on the vehicle 12. In other embodiments, the FAST system 18 may be installed in other areas of the vehicle 12 (e.g., adjacent to an engine).

The antenna 28 generates the wireless local Internet 20 shown in FIG. 1. The local Internet 20 enables two-way wireless communication between the devices on-board the vehicle 12 and other local devices (e.g., local computing device 17, which may be a portable computer operated by a service provider). The local Internet 20 also enables two-way wireless communication with the global Internet 22.

The certified processor 32 includes a processor, memory, and one or more I/O devices. The certified processor 32 is operable to send and receive data to and from the subsystem controllers 16a-c. The certified processor 32 is operable to control the subsystem controllers 16a-c; e.g., the certified processor 32 is operable to send communications to the subsystem controllers 16a-c directing the subsystem controllers 16a-c to send specific data from the sensors 14a-c, and the certified processor 32 is operable to control the frequency and timing of data communications from the subsystem controllers 16a-c to the certified processor 32. In a further embodiment, the certified processor 32 receives data from the subsystems at their default frequency and timing. The certified processor 32 is operable to control the microserver 30; e.g., the certified processor 32 is operable to send communications to the microserver 30. The certified processor 32 is operable to send and receive data to and from the microserver 30. It may be necessary to store significant amounts of communications within the memory of the certified processor 32. The specific amount of memory required is a function of the amount of data generated by the sensors 14a-c and the frequency at which the communications are transmitted between the sensors 14a-c and the certified processor 32. The certified processor 32 may control functions within the microserver 30 that are safety related (e.g., turning off radios required to be inhibited in flight, turning off battery operation during battery critical flight modes, etc.).

The certified processor 32 is operable to manipulate (e.g., translate, condense, process, format, etc.) the data it receives from the subsystem controllers 16a-c. The certified processor 32 includes software stored in memory, which, when executed, enables the certified processor 32 to perform the functions described herein. The software stored in the memory of the certified processor 32 is Level A software. Because the software is Level A, the certified processor 32 is operable to manipulate data of highest criticality. For example, the certified processor 32 is operable to reliably manipulate data indicative of one or more critical engine conditions (e.g., engine data used for directed maintenance, including extended maintenance intervals). The software stored in the memory of the certified processor 32 can manipulate data received from the subsystem controllers 16*a-c* in any one of a number of ways. Notably, the software stored in the memory of certified processor 32 is operable to translate data received from the subsystem controllers 16*a-c*, as necessary, to ensure that it maintains its integrity; certain data formats may be required for use with Level A software (e.g., a Cyclic Redundancy Check (CRC) may be performed on part life extension data). Certain certified processor 32 functions may not require Level A software, in which instance lower level software (e.g., Level B software, Level C software) may be used. The certified processor 32 is operable to make calculations on data that can be sent to local devices (e.g., local computing device 17) for use by service providers. For example, a service provider may use such data to return the vehicle to service if some destructive event happens on the vehicle. In such instances, the certified processor 32 calculates the magnitude of the destructive event and sends information to the service provider via a local device (e.g., local computing device 17). The information sent to the service provider enables the service provider to take appropriate action (e.g., removing a damaged part of the vehicle) to return the vehicle to service.

The microserver 30 includes a processor, memory, and one or more I/O devices. The microserver 30 is operable to send and receive data to and from the certified processor 32. In the embodiment illustrated in FIGS. 1 and 2, communications between the microserver 30 and the local Internet 20 and the global Internet 22 are via wireless connection, and communications between the microserver 30 and certified processor 32 are via wired connection 34 (see FIG. 2). In alternative embodiments, communications between the microserver 30 and the local Internet 20 and the global Internet 22 may be via a wired connection, or communications between the microserver 30 and certified processor 32 may be wired and via the local Internet 20. The microserver 30 is operable to send and receive data to and from the user portal 26 via the global Internet 22, and the microserver 30 is operable to send and receive data to and from the ground mirror database via the global Internet 22. Access to data stored on the microserver 30 is predicated on authorization and is secure, using any number of known encryption and/or authentication technologies. The microserver 30 includes software stored in memory, which, when executed, enables the microserver 30 to perform the functions described herein. The software stored in the memory of the microserver 30 may be any software acceptable for performing the functions described herein. Notably, the software stored in the memory of the microserver 30 need not be Level A software, because the software stored in the memory of the microserver 30 does not manipulate data. The microserver 30 is operable to send data to local devices (e.g., local computing device 17) via local Internet 20. In order for such local devices to receive data from the microserver 30, authentication may be required.

The ground mirror database 24 includes a processor, memory, and one or more I/O devices. The ground mirror database 24 is configured to be located remote from the vehicle 12. The ground mirror database 24 is operable to receive a replica copy of all data received by the certified processor 32, and/or a replica copy of all data manipulated by the certified processor 32. The ground mirror database 24 is in communication with the global Internet 22 and receives data from the certified processor 32 via the global Internet 22 and via the microserver 30. The ground mirror database 24 is operable to recommend certain controls of the certified processor 32; e.g., the ground mirror database 24 is operable to control data communication from the subsystem controllers 16*a-c* to the certified processor 32, including the frequency and timing of such communications. If the certified processor 32 determines that the ground mirror database 24 has requested inappropriate data (e.g., data that the ground mirror database 24 is not permitted to access), then the certified processor 32 will deny the request. The ground mirror database 24 is operable to send and receive data to and from the user portal 26 directly or via the global Internet 22. The ground mirror database 24 may operate as a gatekeeper for all communications sent to and from the certified processor 32 by monitoring, authorizing and controlling the communications to and from the certified processor 32; e.g., if a user wishes to access data on the certified processor 32 via the user portal 26 and the global Internet 22, such access may be approved by or routed through the ground mirror database 24. Access to data stored on the ground mirror database 24 is predicated on authorization and is secure, using any number of known encryption and/or authentication technologies. It may be necessary to store significant amounts of communications data within the memory of the ground mirror database 24. The specific amount of memory required is a function of the amount of communications generated by the certified processor 32 and the frequency at which the communications are transmitted between the certified processor 32 and the ground mirror database 24. The specific amount of memory is also a function of the number of vehicles included in the system 10.

In the embodiment illustrated in FIGS. 1 and 2, the ground mirror database 24 is designed to support a single vehicle. It is recognized, however, that in alternative embodiments, ground mirror database 24 may be designed to support a plurality of vehicles (e.g., one or more fleets of aircraft); e.g., the ground mirror database 24 may be operable to communicate with certified processors on-board each of the plurality of vehicles. In such embodiments, the ground mirror database 24 may organize data received from a plurality of certified processors on-board the plurality of aircrafts as a hierarchical directory of folders, e.g., as described in U.S. patent application Ser. No. 11/605,986. Moreover, the ground mirror database 24 is operable to organize and sort data according to the American Transportation Association (ATA) Chapter numbers, which provide a common referencing standard for commercial aircraft documentation by system function (e.g., ATA Chapter 72 applies to the engine system). Other vehicle standards similar to the ATA Chapter numbers may be used with other types of vehicles (e.g., automobiles). The ground mirror database 24 thereby facilitates management of a vehicle and a fleet of vehicles. For example, the ground mirror database 24 facilitates the collection, storage, organization and accessibility of data indicative of conditions of subsystem components of the vehicles. Such data can be used, e.g., to determine if and when subsystem components of the vehicles need to be repaired and replaced. Moreover, because the certified processor 32 is operable to send the ground mirror database 24 data of highest criticality in near real-time, such data can be used, e.g., to alert vehicle operators and service providers when critical subsystem components (e.g., components of the engine) require immediate repair or replacement.

The user portal 26 includes a web-based application hosted by a server. The server includes a processor, memory, and one or more I/O devices. The user portal server is located remote from the vehicle 12, and may be any suitable server known in the art. The user portal 26 is operable to send and receive communications to and from the ground mirror database 24. Data gathered by and stored on the certified processor 32 and the ground mirror database 24 may be downloaded to the user portal 26. The user portal 26 is operable to selectively download original data stored on the certified processor 32 and/or replica data stored on the ground mirror database 24. The user portal 26 enables a user to control the certified processor 32, which thus enables the user to control the microserver 30, subsystem controllers 16a-c, and sensors 14a-c. For example, the user may send communications to the certified processor 32 via the user portal 26 and the global Internet 22, which communications direct the subsystem controllers 16a-c to collect data from certain sensors 14a-c.

The user portal 26 may include a number of software tools to analyze, organize, and filter data downloaded from the certified processor 32 or the ground mirror database 24. In the embodiment illustrated in FIGS. 1 and 2, the user portal 26 is operable to organize data downloaded from the certified processor 32 or the ground mirror database 24 in a similar manner to the ground mirror database 24; e.g., the user portal 26 is operable to organize data received according to hierarchical folders or ATA Chapters. The web-based application of the user portal 26 includes a graphical user interface (GUI) which provides a user-friendly environment for accessing data downloaded to the user portal 26 and for controlling the certified processor 32 or the ground mirror database 24; e.g., the web-based application allows a user to direct the subsystem controllers 16a-c to collect data from certain sensors 14a-c. In the embodiment illustrated in FIGS. 1 and 2, the web-based application includes user-friendly features (e.g., dropdown menus) for accessing data. The user portal 26 is operable to download data from the certified processor 32 as it is received by the certified processor 32, in near real-time. Alternatively, the user portal 26 is operable to download data from the certified processor 32 or the ground mirror database 24 that has been stored in memory for some time (e.g., hours, days, weeks, etc.). In embodiments having more than one vehicle (e.g., a fleet of vehicles), the user portal 26 may be configured to selectively download data related to any one of the vehicles or all of the vehicles. Moreover, the user portal 26 may be configured to selectively download data indicative of only certain subsystems across the fleet; e.g., if the ground mirror database 24 stores data indicative of engine vibration, engine temperature, and engine pressure for each of three vehicles in a fleet, the user may download only engine vibration data for the three vehicles. The user portal 26 may be operable to manipulate the data from the certified processor 32 or the ground mirror database 24 in order to perform safety critical functions; e.g., in order to perform safety functions similar those performed by Level A software executed by the certified processor 32. The web-based application of the user portal 26 may include an eCommerce store operable to manage the sale of data management features (e.g., product data access, product data insight, etc.) to a user. The user portal 26 may additionally include one or more of the features described, e.g., in U.S. patent application Ser. Nos. 11/605,986 and 11/030,783, which are incorporated herein by reference.

The user portal 26 may be remotely accessed by users in a number of different ways using a variety of devices; e.g., the user may access the user portal 26 using any device having a web browser or other means for accessing the web-based application of the user portal 26. Notably, a user may access the user portal 26 using a web browser on his/her personal computer. Access to the user portal 26 is predicated on authorization and is secure, using any number of known encryption and/or portal technologies. The user portal 26 may be configured so that different users have authorization to access different portions of the data stored on the certified processor 32 and the ground mirror database 24. For example, original equipment manufacturers (OEMs) may have access to certain data, while airline operators, service providers, and regulatory agencies may have access to other data. Moreover, the user portal 26 may be configured so that one user (e.g., an OEM) is able to control which data another user (e.g., an airline) has access to. The user portal 26 includes software stored in memory, which, when executed, enables the user portal 26 to perform the functions described herein.

EXAMPLE

In one example of the operation of the system 10, the certified processor 32 collects data from three sensors 14a-c on the vehicle 12. During operation of the vehicle 12, the first sensor 14a senses data indicative of engine vibration, the second sensor 14b senses data indicative of engine temperature, and the third sensor 14c senses data indicative of engine pressure. The first subsystem controller 16a continuously receives data generated by the first sensor 14a, the second subsystem controller 16b continuously receives data generated by the second sensor 14b, and the third subsystem controller 16c continuously receives data generated by the third sensor 14c. The subsystems controllers send and the certified processor 32 receives the data generated by each of the sensors 14a-c. The data received by the certified processor 32 has been manipulated; e.g., it was stored in a file with a calculated CRC. The certified processor 32 sends the data to the microserver 30. The microserver 30 does not modify the data; it strictly moves the data file from certified processor 32 to the ground mirror database 24, as will be discussed. When the microserver 30 determines that it is an appropriate time to transmit the data (e.g., at the end of a flight), the microserver 30 connects to the ground mirror database 24 via the global Internet 22. The microserver 30 uses the connection to transmit a replica of all of the stored data to the ground mirror database 24. The ground mirror database 24 saves the data to memory. The ground mirror database 24 saves the data into a hierarchical directory of folders that categorizes data by fleet, vehicle, and ATA Chapter. The data generated by the first, second and third sensors 14a-c are all saved to a folder corresponding the ATA Chapter 72—Engine. The above process (e.g., generating data from the three sensors 14a-c, sending replica data from certified processor 32 to ground mirror database 24, etc.) is repeated every time the vehicle 12 is operated.

After each flight, the vehicle owner (e.g., an airline) remotely accesses the ground mirror database 24 via the user portal 26. The vehicle owner uses a personal computer to access the web-based application hosted by the user portal 26 server. The vehicle owner uses the web-based application to review and analyze the data saved in the ground mirror database 24. The vehicle owner identifies the data that it wants the OEM that manufactured the engine to have access to; i.e., the data that it wants the OEM to have authorization to download. In this example, the vehicle owner wants the OEM to have access to the engine vibration data (i.e., the data generated by the first sensor 14a), and the vehicle owner wants to prevent the OEM from accessing the engine temperature data and the engine pressure data (e.g., the data generated by the first and second sensors 14a, 14b, respectively). Using the web-based application, the vehicle owner instructs the user portal 26 to allow the OEM to have access to the engine vibration data, and to prevent the OEM from accessing the engine temperature data and the engine pressure data. The vehicle owner's instructions are saved to the memory of the user portal 26 server.

The OEM subsequently accesses the ground mirror database 24 to view and analyze the engine vibration data. The OEM accesses the ground mirror database 24 via the user portal 26 and the global Internet 22. The user portal 26 grants the OEM access to the engine vibration data based on the instructions saved to memory by the vehicle owner. When the OEM tries to access the engine temperature data or the engine pressure data, the user portal 26 denies the OEM access to the data based on the instructions saved to memory by the vehicle owner. The OEM uses the engine vibration data to ascertain the condition of the engine to determine when the engine may require servicing. This saves the vehicle owner unnecessary warranty, maintenance wear, and spare parts costs.

In the above example, the OEM accesses the replica data saved on the ground mirror database 24. In alternative embodiments, the OEM may alternatively access the original data saved on the certified processor 32. The decision regarding whether to access the replica data saved on the ground mirror database 24 or the original data saved on the certified processor 32 may be made by the user portal 26, and the OEM may be unaware of which set of data it is accessing. The decision to access the original data saved on the certified processor 32 might be made, e.g., if the user wishes to access data in near real-time.

The above example describes an embodiment of the system 10 that includes a single vehicle generating data from three sensors 14*a-c*. It is recognized that in alternative embodiments of the system 10, the system 10 may include a plurality of vehicles organized into one or more fleets, and each vehicle may generating data from more than three sensors.

Although this invention has been shown and described with respect to the detailed embodiments thereof, it will be understood by those skilled in the art that various changes in form and detail may be made without departing from the spirit and scope of the invention.

What is claimed is:

1. A system for managing a vehicle, comprising:
   at least one sensor installed on the vehicle, wherein the at least one sensor is operable to generate data indicative of a critical condition of the vehicle, and wherein the data has a level of criticality;
   a certified processor located on the vehicle and in communication with a computer network, wherein the certified processor is operable to perform a calculation on the data generated by the at least one sensor and is operable to generate calculation data indicative of the calculation, wherein the calculation data has the level of criticality of the data generated by the at least one sensor, and wherein the certified processor is operable to store the calculation data;
   a database located remote from the vehicle and in communication with the computer network, wherein the database is operable to selectively download and store a replica of the calculation data stored on the certified processor via the computer network; and
   a subsystem controller in communication with the certified processor and the at least one sensor, wherein the subsystem controller is operable to receive the data generated by the at least one sensor, and wherein the subsystem controller is operable to send the data generated by the at least one sensor to the certified processor.

2. The system of claim 1, further comprising a user portal located remote from the vehicle and in communication with the computer network, wherein the user portal enables at least one of a plurality of users to download, via the computer network, selected portions of the calculation data stored on the certified processor or selected portions of the replica data stored on the database.

3. The system of claim 2, wherein the user portal is operable to prevent at least one of the plurality of users from downloading selected portions of the calculation data or the replica data.

4. The system of claim 2, wherein the user portal permits a first of the plurality of users to access a first selected portion of the calculation data or the replica data, wherein the user portal permits a second of the plurality of users to access a second selected portion of the calculation data or the replica data, and wherein the first selected portion is different from the second selected portion.

5. The system of claim 1, wherein the computer network is one of a wired computer network or a wireless computer network.

6. The system of claim 1, wherein the database is operable to store the replica data within a hierarchical directory of folders.

7. The system of claim 1, wherein the certified processor is operable to execute software, wherein the software is Level A software as defined by Radio Technical Commission for Aeronautics DO-178B specifications.

8. The system of claim 1, further comprising a microserver in communication with the certified processor and the database;
   wherein the database is operable to selectively download and store the replica data via the computer network and the microserver; and
   wherein the microserver is not operable generate calculation data having the level of criticality of the data generated by the at least one sensor.

9. A method of managing a vehicle, comprising the steps of:
   using at least one sensor installed on the vehicle to generate data indicative of a critical condition of the vehicle, wherein the data has a level of criticality;
   using a certified processor located on the vehicle to perform a calculation on the data generated by the at least one sensor, and to generate calculation data indicative of the calculation, wherein the calculation data has the level of criticality of the data generated by the at least one sensor, and wherein the data generated by the at least one sensor is communicated to the certified processor through a subsystem controller;
   using the certified processor to store the calculation data;
   selectively downloading and storing a replica of the calculation data stored on the certified processor to a database located remote from the vehicle, via a computer network; and
   using a user portal located remote from the vehicle and in communication with the computer network to enable at least one of a plurality of users to download, via the computer network, selected portions of the calculation data stored on the certified processor or selected portions of the replica data stored on the database.

10. The method of claim 9, further comprising the step of:
    analyzing the selected portions of the calculation data stored on the certified processor, or the selected portions of the replica data stored on the database, to determine whether a part of the vehicle requires repair or replacement.

11. The method of claim 9, further comprising the step of:
    preventing at least one of the plurality of users from downloading portions of the data or the replica data.

12. The method of claim 9, further comprising the step of:
    allowing a first of the plurality of users to access a first portion of the calculation data or the replica data and allowing a second of the plurality of users to access a second portion of the data or the replica data, wherein the first portion is different from the second portion.

13. The method of claim 9, wherein the certified processor is operable to execute software, wherein the software is Level A software as defined by Radio Technical Commission for Aeronautics DO-178B specifications.

14. The method of claim 9, wherein the database is operable to store the replica data within a hierarchical directory of folders.

15. The method of claim 9, wherein the step of selectively downloading and storing a replica of the calculation data stored on the certified processor to a database located remote from the vehicle is via the computer network and a microserver that is in communication with the certified processor and the database;
    wherein the microserver is not operable to generate calculation data having the level of criticality of the data generated by the at least one sensor.

* * * * *